(12) United States Patent  
Sriram (10) Patent No.: US 12,531,261 B2
(45) Date of Patent: Jan. 20, 2026

(54) FUEL CELL UNIT (71) Applicant: Robert Bosch GmbH, Stuttgart (DE)

(72) Inventor: Sriganesh Sriram, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 515 days.

(21) Appl. No.: 17/794,788

(22) PCT Filed: Dec. 17, 2020

(86) PCT No.: PCT/EP2020/086851
§ 371 (c)(1),
(2) Date: Jul. 22, 2022

(87) PCT Pub. No.: WO2021/148207
PCT Pub. Date: Jul. 29, 2021

(65) Prior Publication Data
US 2023/0124636 A1 Apr. 20, 2023

(30) Foreign Application Priority Data

Jan. 23, 2020 (DE) ............. 10 2020 200 769.1

(51) Int. Cl.
*H01M 8/248* (2016.01)
*H01M 8/0267* (2016.01)
(Continued)

(52) U.S. Cl.
CPC ....... *H01M 8/248* (2013.01); *H01M 8/04029* (2013.01); *H01M 8/04074* (2013.01);
(Continued)

(58) Field of Classification Search
CPC ............. H01M 8/248; H01M 8/04029; H01M 8/04074; H01M 8/2475; H01M 8/0267; H01M 2250/20
See application file for complete search history.

(56) References Cited

U.S. PATENT DOCUMENTS 7,352,578 B2 * 4/2008 Willets .............. H01M 8/04052
307/64
2002/0119357 A1 * 8/2002 Baldauf .............. H01M 8/2425
429/432
(Continued)

FOREIGN PATENT DOCUMENTS

CN 1479397 A 3/2004
CN 103247807 A 8/2013
(Continued)

OTHER PUBLICATIONS

Machine translation of DE102004013256A1 (Feb. 22, 2025) (Year: 2025).*

(Continued)

*Primary Examiner* — Matthew J Merkling
(74) *Attorney, Agent, or Firm* — Michael Best & Friedrich LLP (57) ABSTRACT

Fuel cell unit (1) in the form of a fuel cell stack (1) for electrochemical generation of electrical energy, comprising fuel cells (2) having anodes, cathodes, proton-exchange membranes, gas diffusion layers and bipolar plates, the fuel cell unit (1) comprising at least one latent heat storage device (45) with a phase change material (46) to prevent water from freezing in the fuel cells (2) or delay such freezing.

13 Claims, 6 Drawing Sheets (51) Int. Cl.
  *H01M 8/04007* (2016.01)
  *H01M 8/04029* (2016.01)
  *H01M 8/2475* (2016.01)

(52) U.S. Cl.
  CPC ........ *H01M 8/2475* (2013.01); *H01M 8/0267* (2013.01); *H01M 2250/20* (2013.01)

(56) References Cited

U.S. PATENT DOCUMENTS

| | | | | |
|---|---|---|---|---|
| 2014/0329161 | A1* | 11/2014 | Laurencin | H01M 8/04052 204/267 |
| 2015/0372326 | A1* | 12/2015 | Hiemer | H01M 8/2475 429/434 |
| 2017/0125866 | A1* | 5/2017 | Zhou | H01M 8/04067 |
| 2018/0114998 | A1* | 4/2018 | Kwon | H01M 8/04225 |
| 2018/0219237 | A1* | 8/2018 | Shaikh | H01M 8/04723 |
| 2021/0057793 | A1* | 2/2021 | Hendriksen | H01M 10/659 |
| 2021/0098801 | A1* | 4/2021 | Shieh | H01M 8/04074 |

FOREIGN PATENT DOCUMENTS

| | | | | |
|---|---|---|---|---|
| CN | 203326038 | U * | 12/2013 | |
| CN | 106207237 | A | 12/2016 | |
| CN | 106654318 | A | 5/2017 | |
| CN | 209374566 | U | 9/2019 | |
| DE | 102004013256 | A1 | 10/2005 | |
| DE | 102007033428 | A1 * | 1/2009 | ........ H01M 8/04052 |
| DE | 102016123649 | A1 | 6/2018 | |
| JP | 2000208156 | A * | 7/2007 | ........ H01M 8/04119 |

OTHER PUBLICATIONS

Machine Translation of CN-203326038-U (May 1, 2025) (Year: 2025).*
Machine Translation of DE-102007033428-A1 (May 5, 2025) (Year: 2025).*
Machine Translation of CN106207237A (Jul. 9, 2025) (Year: 2025).*
Translation of International Search Report for Application No. PCT/EP2020/086851 dated Mar. 26, 2021 (3 pages).

* cited by examiner

FUEL CELL UNIT

BACKGROUND

The present invention relates to a fuel cell unit and a fuel cell system.

Fuel cell units in the form of galvanic cells use redox reactions at an anode and a cathode to convert continuously supplied fuel and oxidant into electrical energy. Fuel cells are employed in a very wide variety of stationary and mobile applications, for example in houses without connection to the power grid or in motor vehicles, in rail transport, in aviation, in astronautics and in shipping. In fuel cell units a multiplicity of fuel cells is arranged in a stack.

Especially in mobile applications of fuel cells in motor vehicles, in rail transport, in shipping and in aerospace the fuel cells are subject to ambient temperature when idle. The proton-exchange membranes and the gas diffusion layers contain water which freezes at ambient temperatures below 0° C. Water expands, i.e. increases in volume, during freezing, thus potentially resulting in high mechanical stresses, and in the case of a large number of freeze cycles, even in significant damage. After freezing while idle, restarting results in the fuel cell unit 1 re-attaining an operating temperature of for example 65° C., thus thawing the water again. Ambient temperatures below 0° C. and alternating operation and idling of the fuel cell unit 1 thus result in occurrence of repeated damaging freeze-thaw cycles of the water in the fuel cell.

SUMMARY

Fuel cell unit according to the invention in the form of a fuel cell stack for electrochemical generation of electrical energy comprising fuel cells having anodes, cathodes, proton-exchange membranes, gas diffusion layers and bipolar plates, wherein the fuel cell unit comprises at least one latent heat storage means comprising a phase-change material for preventing or retarding freezing of water in the fuel cells. The phase-change material liberates heat of fusion upon conversion from the liquid to the solid state of matter and this heat of fusion is passed to the water in the fuel cells, thus preventing or retarding damaging freezing of the water in the fuel cell.

In a further embodiment the phase-change material of the at least one latent heat storage means exhibits a phase change in the form of a change in the state of matter from a liquid to a solid to liberate heat as heat of fusion. The phase-change material liberates a large amount of heat of fusion per unit mass and/or volume and even small masses and/or volumes of phase-change material can therefore contribute substantially to the retarding or prevention of freezing of the water.

The solidification point of the phase-change material is advantageously between 0° and 60° C., in particular between 0° C. and 15° C. The solidification point of the phase-change material should only be slightly above 0° C. so that the heat of fusion is liberated only shortly before the freezing temperature of the water of 0° C. is reached and is thus employed effectively to prevent freezing of the water.

In a further embodiment the fuel cell unit comprises a housing.

In a complementary variant the at least one latent heat storage means is arranged within an interior encompassed by the housing. The heat of fusion liberated by the latent heat storage means is thus passed substantially to the fuel cells and only to a negligible extent directly to the environment without heating the fuel cells.

In a further embodiment the at least one latent heat storage means is disposed between the housing and the stacked fuel cells.

The latent heat storage means is advantageously arranged on an inside of the housing.

In a complementary variant the at least one latent heat storage means covers the inside of the housing to an extent of at least 80%, 90% or 95%, in particular completely.

In a further variant the at least one heat storage means is disposed on an outside of the stacked fuel cells.

In a complementary embodiment the at least one latent heat storage means covers the outside of the stacked fuel cells to an extent of at least 80%, 90% or 95%, in particular completely. The heat of fusion of the latent heat storage means can therefore effect substantially uniform heating of the fuel cells.

The at least one latent heat storage means is preferably integrated into the fuel cells.

In a further variant a plurality of latent heat storage means comprising separate partial masses of the phase-change material are integrated into the fuel cells.

In a further embodiment a plurality of latent heat storage means comprising separate partial masses of the phase-change material are integrated into each fuel cell. A large number of latent heat storage means distributed over the fuel cells allow uniform heating of the fuel cells with heat of fusion.

In a complementary variant the phase-change material of a plurality of latent heat storage means is arranged in and/or on fluid-tight cavities in the bipolar plates of the fuel cells.

Fuel cell system according to the invention, in particular for a motor vehicle, comprising a fuel cell unit in the form of a fuel cell stack comprising fuel cells, a compressed gas storage means for storage of gaseous fuel, a gas conveying apparatus for conveying a gaseous oxidant to the cathodes of the fuel cells, wherein the fuel cell unit is in the form of a fuel cell unit as described in the present patent application.

It is preferable when the solidification point of the phase-change material is higher than 1° C., 2° C. or 3° C. and/or lower than 10° C. or 15° C. The solidification point of the phase-change material is thus slightly higher than the solidification point of water.

It is advantageous when the housing of the stacked fuel cells encompasses the stacked fuel cells substantially completely. Substantially completely is preferably to be understood as meaning that the housing encompasses the fuel cells to an extent of at least 80%, 90% or 95%.

In a further embodiment the phase-change material is $LiClO_3·3H_2O$ and/or an aqueous calcium chloride solution having a molar concentration of the calcium chloride in water of at least 38% and/or paraffins.

In a further embodiment the cavities comprising the phase-change material of the latent heat storage means are each fluid-tightly separated from cooling channels for coolant in the bipolar plates with, especially exclusively with, a respective, especially only one respective, heat-conducting wall.

In a complementary embodiment the thermal conductivity $\lambda$ author thermal insulation is less than 0.5 W/m·K or 0.1 W/m·K or 0.05 W/m·K.

In a further embodiment the thickness of the thermal insulation is at least 0.1 cm or 0.2 cm or 0.5 cm or 1 cm.

In an additional embodiment the phase-change material is arranged in at least one fluid-tight cavity delimited by at least one wall. The phase-change material thus does not come into contact with for example the fuel, the oxidant or the coolant.

In a complementary variant the mass of the phase-change material of the at least one latent heat storage means comprises at least 0.5% by mass, 1% by mass, 3% by mass or 5% by mass of the mass of the stacked fuel cells.

In a complementary variant the volume of the phase-change material of the at least one latent heat storage means comprises at least 0.5% by volume, 1% by volume, 3% by volume or 5% by volume of the volume of the stacked fuel cells.

In a further embodiment the fuel cells of the fuel cell unit are stacked.

The at least one latent heat storage means comprises at least one cavity filled with the phase-change material delimited by at least one wall.

In a further variant the fuel cell unit comprises at least one joining apparatus, in particular a plurality of joining apparatuses, and clamping elements.

Components for fuel cells are advantageously proton-exchange membranes, anodes, cathodes, gas diffusion layers and bipolar plates.

In a further embodiment the fuel cells each comprise a proton-exchange membrane, an anode, a cathode, at least one gas diffusion layer and at least one bipolar plate.

In a further embodiment the joining apparatus is in the form of a bolt and/or is rod-shaped.

The clamping elements are advantageously in the form of clamping plates.

In a further variant of the gas conveying operation is in the form of a blower or a compressor.

The fuel cell unit especially comprises at least 3, 4, 5 or 6 joining apparatuses.

In a further embodiment the clamping elements are plate-shaped and/or disc-shaped and/or planar and/or in the form of a grid.

The fuel is preferably hydrogen, hydrogen-rich gas, reformate gas or natural gas.

The fuel cells are advantageously substantially planar and/or disc-shaped.

In a complementary variant the oxidant is air comprising oxygen or pure oxygen.

The fuel cell unit is preferably a PEM fuel cell unit comprising PEM fuel cells.

BRIEF DESCRIPTION OF THE DRAWINGS

Exemplary embodiments of the invention are hereinbelow more particularly described with reference to the accompanying figures, in which.

DETAILED DESCRIPTION

Figure 1:
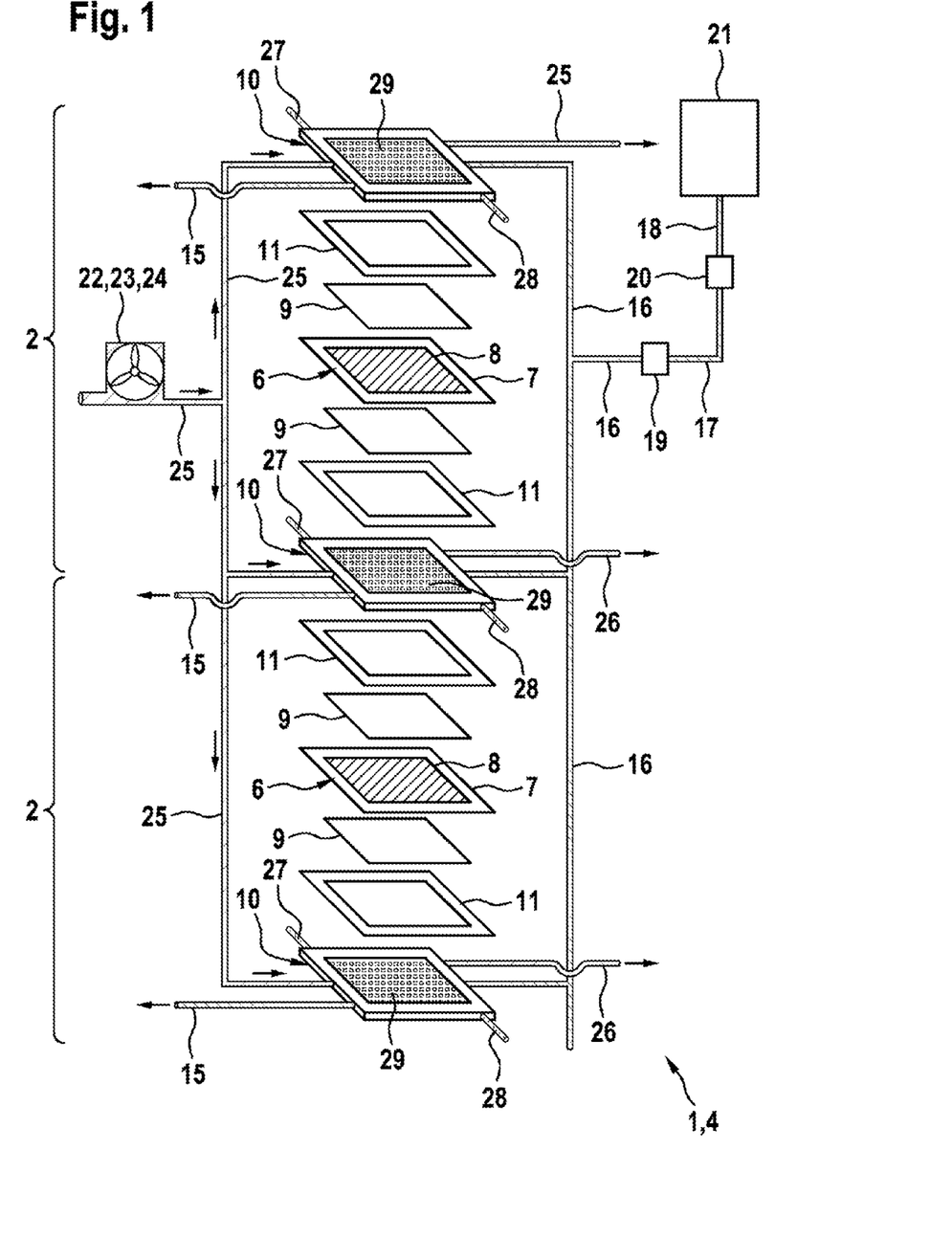
FIG. 1 shows a highly simplified exploded view of a fuel cell system comprising components of a fuel cell.
Figure 2:
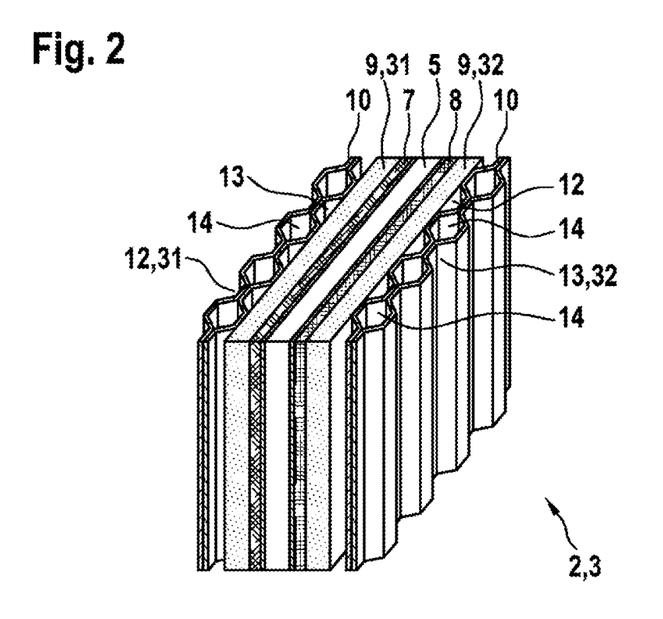
FIG. 2 shows a perspective view of a portion of a fuel cell.
Figure 3:
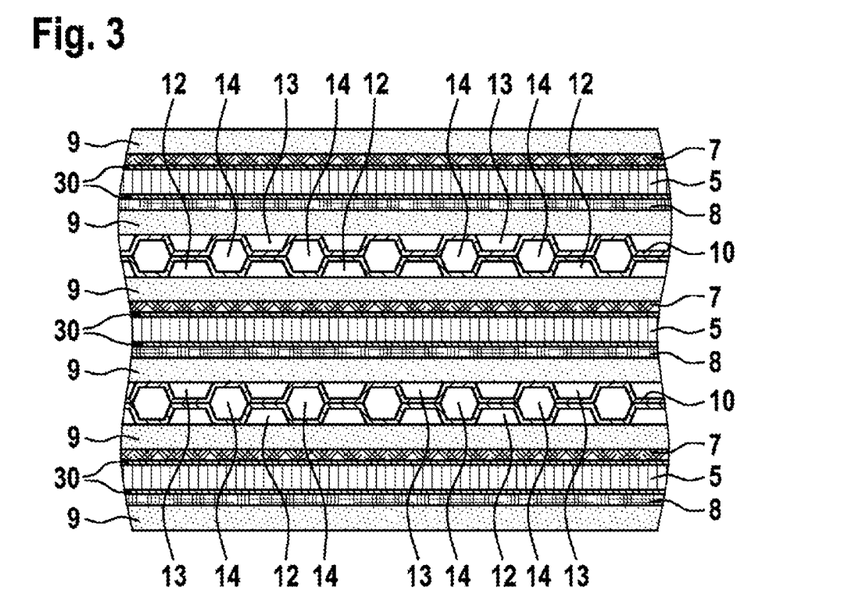
FIG. 3 shows a longitudinal section through a fuel cell.

FIGS. 1 to 3 show the basic construction of a fuel cell 2 in the form of a PEM fuel cell 3 (polymer electrolyte fuel cell 3). The principle of fuel cells 2 is that of generating electrical energy/current by means of an electrochemical reaction. Hydrogen $H_2$ is passed to an anode 7 as a gaseous fuel and the anode 7 forms the negative terminal. A gaseous oxidant, namely air comprising oxygen, is passed to a cathode 8, i.e. the oxygen in the air provides the necessary gaseous oxidant. A reduction (electron gain) occurs at the cathode 8. The oxidation, i.e. electron loss, is performed at the anode 7.

The redox equations of the electrochemical processes are as follows:

Cathode:

$$O_2 + 4H^+ + 4e^- \rightarrow 2H_2O$$

Anode:

$$2H_2 \rightarrow 4H^+ + 4e^-$$

Overall Reaction Equation of Cathode and Anode:

$$2H_2 + O_2 \rightarrow 2H_2O$$

The difference between the standard potentials of the electrode pairs under standard conditions in the form of the reversible fuel cell voltage or idle voltage of the fuel cell 2 under no load is 1.23 V. This theoretical voltage of 1.23 V is not achieved in practice. In the idle state and at small currents it is possible to achieve voltages above 1.0 V and in operation with relatively large currents voltages between 0.5 V and 1.0 V are achieved. Serial connection of a plurality of fuel cells 2, in particular a fuel cell unit 1 in the form of a fuel cell stack 1 of a plurality of superposed fuel cells 2, exhibits a higher voltage which corresponds to the number of fuel cells 2 multiplied by the individual voltage of a single fuel cell 2.

The fuel cell 2 further comprises a proton-exchange membrane 5 (PEM) which is arranged between the anode 7 and the cathode 8. The anode 7 and the cathode 8 are in the form of the layers or discs. The PEM 5 functions as the electrolyte, catalyst support and separator for the reaction gases. The PEM 5 further functions as an electrical insulator and prevents an electrical short circuit between the anode 7 and the cathode 8. Proton-conducting films made of perfluorinated and sulfonated polymers of 12 μm to 150 μm in thickness are generally employed. The PEM 5 conducts the protons $H^+$ and substantially blocks ions other than $H^+$, so that the permeability of the PEM 5 to the protons $H^+$ allows charge transport to take place. The PEM 5 is substantially impermeable to the reaction gases oxygen $O_2$ and hydrogen $H_2$, i.e. blocks the flow of oxygen $O_2$ and hydrogen Hz between a gas space 31 at the anode 7 comprising the fuel hydrogen Hz and a gas space 32 at the cathode 8 comprising air/oxygen $O_2$ as the oxidant. The proton conductivity of the PEM 5 increases with increasing temperature and increasing water content.

The electrodes 7, 8 in the form of the anode 7 and the cathode 8 rest against both sides of the PEM 5, respectively facing the gas spaces 31, 32. A unit composed of the PEM 5 and the electrodes 6, 7 is referred to as a membrane electrode assembly 6 (MEA). The electrodes 7, 8 are pressed together with the PEM 5. The electrodes 6, 7 are platinum-containing carbon particles which are bound to PTFE (polytetrafluoroethylene), FEP (fluorinated ethylene-propylene copolymer), PFA (perfluoroalkoxy), PVDF (polyvinylidene fluoride) and/or PVA (polyvinyl alcohol) and are hot-pressed into microporous carbon fiber, glass fiber or polymer mats. A catalyst layer 30 is normally applied to the electrodes 6, 7 on the side facing the gas spaces 31, 32. The catalyst layer 30 at the gas space 31 comprising fuel at the anode 7 comprises nanodisperse platinum-ruthenium on graphitized carbon black particles which are bound to a binder. The catalyst layer 30 at the gas space 32 comprising oxidant at the cathode 8 similarly comprises nanodisperse platinum. The binder used is, for example, Nafion®, a PTFE emulsion or polyvinyl alcohol.

A gas diffusion layer 9 (GDL) rests against the anode 7 and the cathode 8. The gas diffusion layer 9 on the anode 7 distributes the fuel from channels 12 for fuel uniformly over the catalyst layer 30 on the anode 7. The gas diffusion layer 9 on the cathode 8 distributes the oxidant from channels 13 for oxidant uniformly over the catalyst layer 30 on the cathode 8. The GDL 9 additionally serves to take off water of reaction in the reverse direction to the flow direction of the reaction gases, i.e. in a direction from the catalyst layer 30 to the channels 12, 13. Furthermore, the GDL 9 keeps the PEM 5 moist and conducts the current. The GDL 9 is, for example, composed of a hydrophobicized carbon paper and a bonded carbon powder layer.

A bipolar plate 10 is rests against the GDL 9. The electrically conductive bipolar plate 10 serves as current collector, for water removal and for passing the reaction gases through a channel structure 29 and/or a flow field 29 and for removing the waste heat which occurs, in particular, in the exothermic electrochemical reaction at the cathode 8. For removing the waste heat, channels 14 for passage of a liquid or gaseous coolant are incorporated in the bipolar plate 10. The channel structure 29 at the gas space 31 for fuel is formed by channels 12. The channel structure 29 at the gas space 32 for oxidant is formed by channels 13. Employed materials for the bipolar plates 10 are, for example, metal, conductive polymers and composite materials or graphite.

Figure 4:
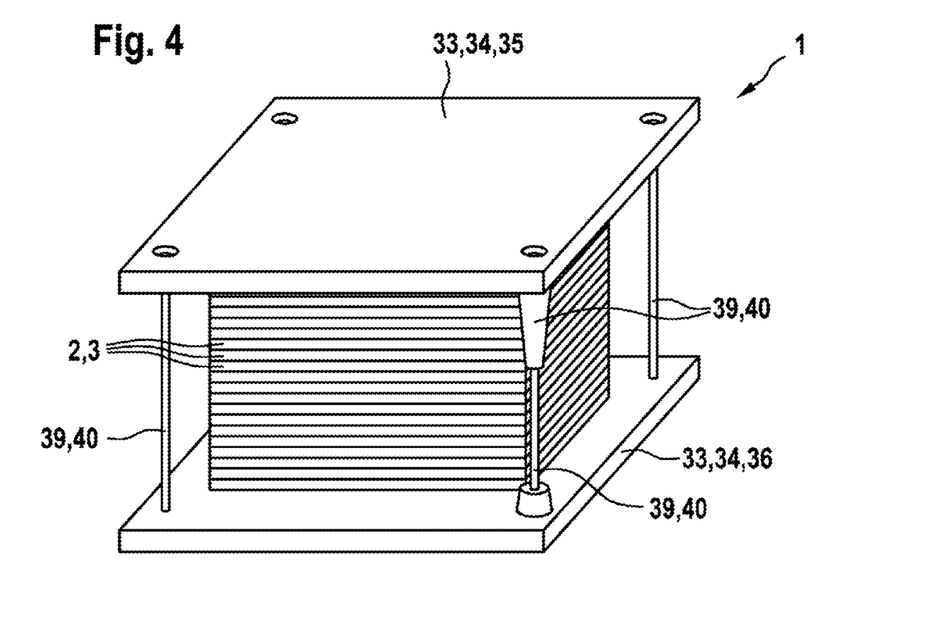
FIG. 4 shows a perspective view of a fuel cell unit in the form of a fuel cell stack.
Figure 5:
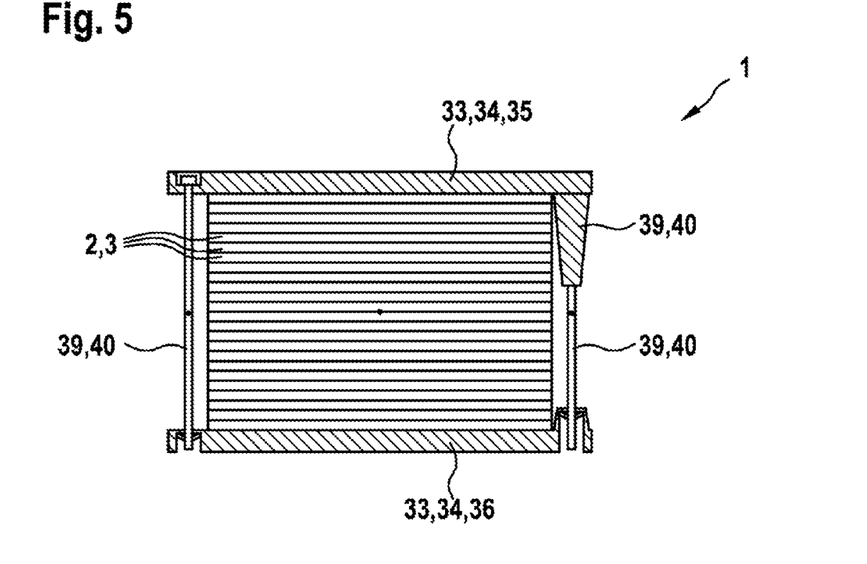
FIG. 5 shows a section through the fuel cell unit of FIG. 4.

A plurality of fuel cells 2 are arranged in stacked fashion in a fuel cell unit 1 and/or a fuel cell stack 1 and/or a fuel cell stack 1 (FIG. 4). FIG. 1 shows an exploded view of two superposed fuel cells 2. A seal 11 forms effects fluid-tight sealing of the gas spaces 31, 32. Hydrogen $H_2$ as fuel is stored at a pressure of, for example, from 350 bar to 700 bar in a compressed gas storage means 21 (FIG. 1). From the compressed gas storage means 21, the fuel is passed through a high-pressure conduit 18 to a pressure reducer 20 in order to reduce the pressure of the fuel in an intermediate-pressure conduit 17 of about 10 bar to 20 bar. From the intermediate-pressure conduit 17, the fuel is passed to an injector 19. At the injector 19, the pressure of the fuel is reduced to an injection pressure in the range from 1 bar to 3 bar. From the injector 19, the fuel is introduced into a feed conduit 16 for fuel (FIG. 1) and from the feed conduit 16 into the channels 12 for fuel, which form the channel structure 29 for fuel. The fuel thus flows through the gas space 31 for the fuel. The gas space 31 for the fuel is formed by the channels 12 and the GDL 9 at the anode 7. After flowing through the channels 12, the fuel which has not been consumed in the redox reaction at the anode 7 and possibly water from controlled moistening of the anode 7 are discharged from the fuel cells 2 through a discharge conduit 15.

A gas conveying means 22, for example configured as a blower 23 or a compressor 24, conveys air from the surroundings as an oxidant into a feed conduit 25 for oxidant. From the feed conduit 25, the air is introduced into the channels 13 for oxidant, which form a channel structure 29 at the bipolar plates 10 for oxidant, so that the oxidant flows through the gas space 32 for the oxidant. The gas space 32 for the oxidant is formed by the channels 13 and the GDL 9 at the cathode 8. After flowing through the channels 13 or the gas space 32 for the oxidant 32, the oxidant which has not been consumed at the cathode 8 and the water of reaction formed at the cathode 8 as a result of the electrochemical redox reaction is discharged from the fuel cells 2 through a discharge conduit 26. A feed conduit 27 serves to introduce coolant into the channels 14 for coolant and a discharge conduit 28 serves to discharge the coolant which has been passed through the channels 14. The feed and discharge conduits 15, 16, 25, 26, 27, 28 are shown as separate conduits in FIG. 1 for the sake of simplicity and may in fact be have a different construction, for example in the form of holes in a frame (not shown) or as flush holes at the end region (not shown) of superposed bipolar plates 10. The fuel cell stack 1 together with the pressurized gas storage means 21 and the gas conveying means 22 forms a fuel cell system 4.

In the fuel cell unit 1, the fuel cells 2 are arranged between two clamping elements 33 in the form of clamping plates 34. An upper clamping plate 35 rests against the uppermost fuel cell 2 and a lower clamping plate 36 rests against the bottommost fuel cell 2. The fuel cell unit 1 comprises approximately 300 to 400 fuel cells 2, which for the sake of the clarity of the figure are not all shown in FIG. 4. The clamping elements 33 exert a compressive force on the fuel cells 2, i.e. the upper clamping plate 35 rests against the uppermost fuel cell 2 with a compressive force and the lower clamping plate 36 rests against the lowermost fuel cell 2 with a compressive force. The fuel cell stack 2 is thus clamped in order to ensure media-tightness for the fuel, the oxidant and the coolant, in particular on account of the elastic seal 11, and also to keep the electrical contact resistance within the fuel stack 1 as small as possible. To clamp the fuel cells 2 by means of the clamping elements 33, four joining apparatuses 39 in the form of bolts 40, which are under tensile stress, are disposed on the fuel cell unit 1. The four bolts 40 are securely joined to the clamping plates 34.

FIGS. 1 to 5 are merely for basic elucidation of the mode of operation of fuel cell units 1, and FIGS. 1 to 5 therefore do not show the latent heat storage means 45 according to the invention.

Figure 6:
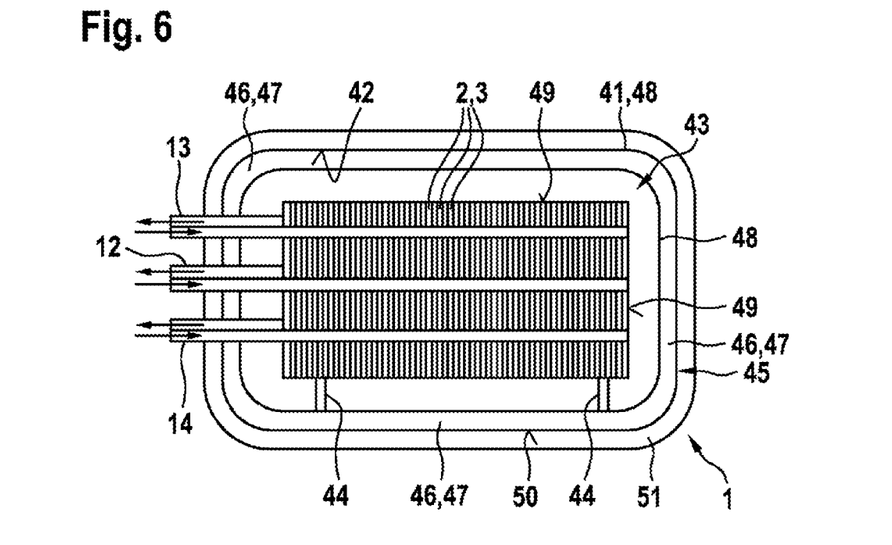
FIG. 6 shows a section through the fuel cell unit comprising a latent heat storage means in a first exemplary embodiment.

FIG. 6 shows the fuel cell unit 1 having large number of stacked fuel cells 2 in a first exemplary embodiment. The stacked fuel cells 2 in the form of fuel cell stack 1 have an outside 49. A housing 41 delimits an interior 43 and the fuel cells 2 are arranged within the interior 43. The stacked fuel cells 2 are fixed to the housing 41 with retaining feet 44. Arranged at a substantially constant distance from an inside 42 of the housing 41 is a wall 48, a cavity 47 therefore being present between the wall 48 and the housing 41. The housing 41 thus likewise serves to delimit the cavity 47 and the housing 41 therefore additionally forms a wall 48 for delimiting the fluid-tight cavity 47. A thermal insulation 51 is present on an outside 50 of the housing 41. The cavity 47 is filled with a phase-change material 46 having a solidification point between 0° C. and 15° C. as a latent heat storage means 45. The phase-change material 46 is for example LiClO$_3$·3H$_2$O having a solidification point of about 8° C. or an aqueous calcium chloride solution having a molar concentration of the calcium chloride in the water of at least 38%. In a departure therefrom it is also possible to employ paraffins having a solidification point of about 5° C. as the phase-change material.

Figure 10:
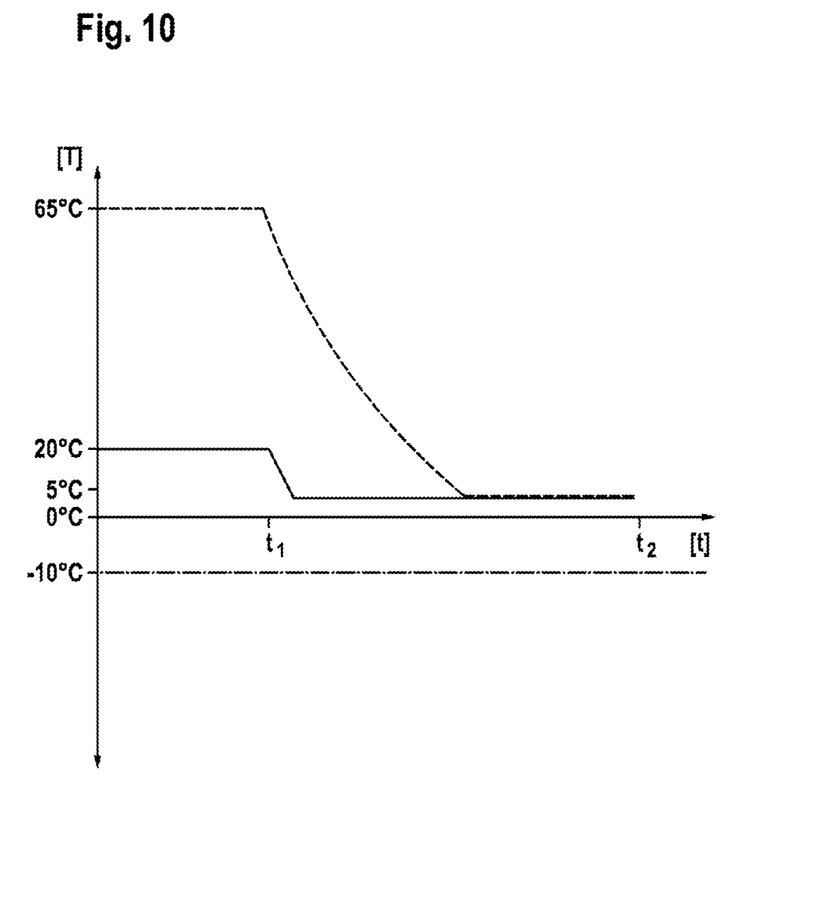

In the diagram shown in FIG. 10 the time t is plotted on the abscissa and the temperature T is plotted on the ordinate. In the period from time 0 to $t_1$ the fuel cell unit 1 is in operation. The outside temperature is −10° C. In the period from $t_1$ to $t_2$ the fuel cell unit 1 is switched off. After time $t_2$ the fuel cell unit 1 is shut down/deactivated again. The outside temperature is shown in the diagram with a dot-dashed straight line. The temperature of the stacked fuel cells 2 is shown with a dashed line. The temperature of the inner wall 48 for delimiting the cavity 47 is shown with a solid line. Electrochemical processes in the fuel cell unit 1 are exothermic, so that due to the thermal discharge and the cooling of the fuel cell unit 1 with the coolant the operating temperature remains substantially constant at 65° C. during operation until shutdown of the fuel cell unit 1 at time $t_1$. The housing 41 has a temperature of about 20° C. during operation of the fuel cell unit 1. After shutdown of the fuel cell unit 1 no more thermal discharge is liberated and the temperature of the stacked fuel cells 2 and the inner wall 48 therefore falls.

The fluid-tight cavity 47 is filled with paraffin having a solidification point of about 5° C. as the phase-change material 46. During operation of the fuel cell 1 the phase-change material 46 is therefore in a liquid state of matter and on account of the fall in the temperature in the phase-change material 46 due to the low outside temperature of −10° C., the phase-change material 46 may be converted into the solid state of matter in case of a fall in the temperature in the phase-change material 46 below 5° C. Upon conversion of the phase-change material 46 from the liquid to the solid state of matter the phase-change material 46 liberated large amounts of heat of fusion, so that after achieving the temperature of the phase-change material 46 of about 5° C. the temperature of the phase-change material 46 does not fall further for a certain period. Due to the heat of fusion liberated by the phase-change material 46 in the period from $t_1$ to $t_2$ during the solidification process the temperature in the stacked fuel cells 2 does not fall below 5° C. either. Water is present in the gas space 32 for oxidant, in particular at the gas diffusion layer 9 of the gas space 32, and in the proton-exchange membrane 5. This water therefore does not freeze during the idle state of the fuel cell unit 1 in the period from $t_1$ to $t_2$, and therefore melting of the water in the proton-exchange membrane 5 and the gas space 32 for oxidant is not necessary after restarting of the fuel cell unit 1 after time $t_2$. On account of the large amount of heat of fusion liberated by the phase-change material 46 and the good thermal insulation 51 the temperature in the fuel cell unit 1 falls to below 5° C. only after about 48 h. However, the period from $t_1$ to $t_2$ is 24 h and therefore restarting of the fuel cell unit 1 does not require melting of water in the fuel cell unit 1.

Figure 7:
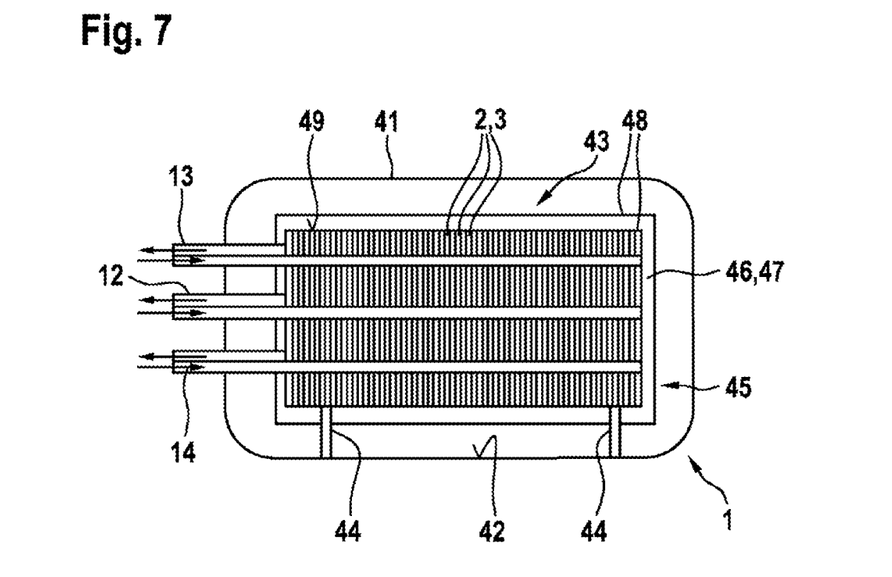
FIG. 7 shows a section through the fuel cell unit comprising the latent heat storage means in a second exemplary embodiment.

FIG. 7 shows a second exemplary embodiment of the fuel cell unit 1. Essentially only the differences from the first exemplary embodiment according to FIG. 6 are described below. The latent heat storage means 45 is secured not on the outside 42 of the housing 41 but rather on the outside 49 of the stacked fuel cells 2. The latent heat storage means 45 covers the outside 49 of the stacked fuel cells 2 substantially completely. The outside 50 of the housing 41 moreover has no thermal insulation 51 secured to it and therefore the thermal conductivity of the interior 43 of the housing 41 to outside the housing 41 is greater with the result that the period until complete solidification of the phase-change material 46 and the falling of the temperature of the fuel cell 1 is shorter than in the first exemplary embodiment because more heat of fusion of the phase-change material 46 is dissipated to the environment per unit time by the housing 41 without thermal insulation 51.

Figure 8:
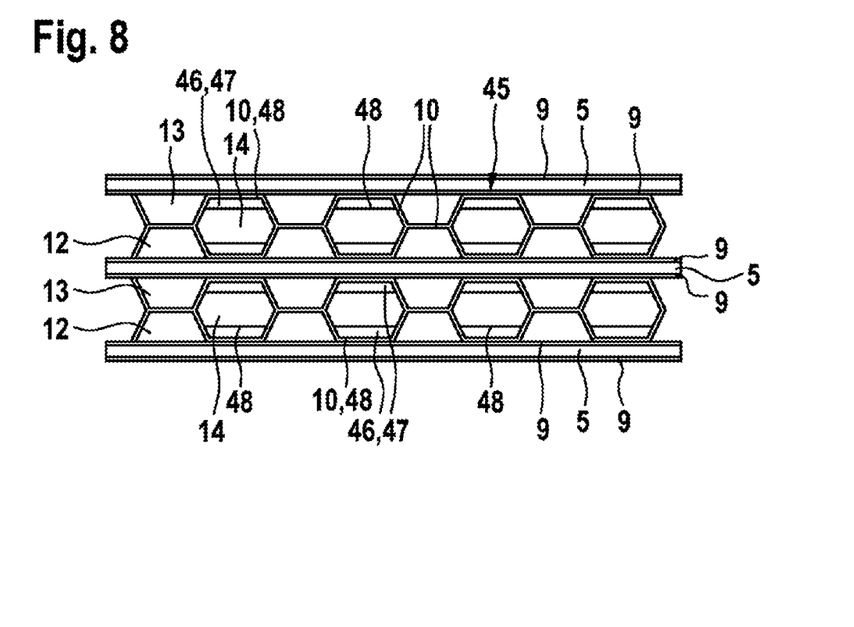
FIG. 8 shows a section through the fuel cell comprising integrated latent heat storage means in a third exemplary embodiment.

FIG. 8 shows a third exemplary embodiment of a portion of the fuel cell unit 1. Essentially only the differences from the first exemplary embodiment according to FIG. 6 are described below. The bipolar plate 10 has a large number of cavities 47 comprising the phase-change material 46. The wall 48 for delimiting the cavity 47 separates the cavity 47 from the channel 14 for coolant. Another portion of the wall 48 is formed by the bipolar plate 10. The latent heat storage means 45 are therefore arranged in proximity to the gas diffusion layers 9 and the proton-exchange membranes 5 and the heat of fusion liberated by the phase-change material 46 thus has only a very short path of thermal conduction to the gas diffusion layers 9 and the proton-exchange membranes 5. The latent heat storage means 45 are aligned substantially parallel to notional planes (not shown) defined by the gas diffusion layers 9 and the proton-exchange membranes 5. The notional planes are aligned substantially perpendicular to the drawing plane of FIG. 8. The stacked fuel cells 2 are surrounded by the housing 41 (not shown in FIG. 8).

Figure 9:
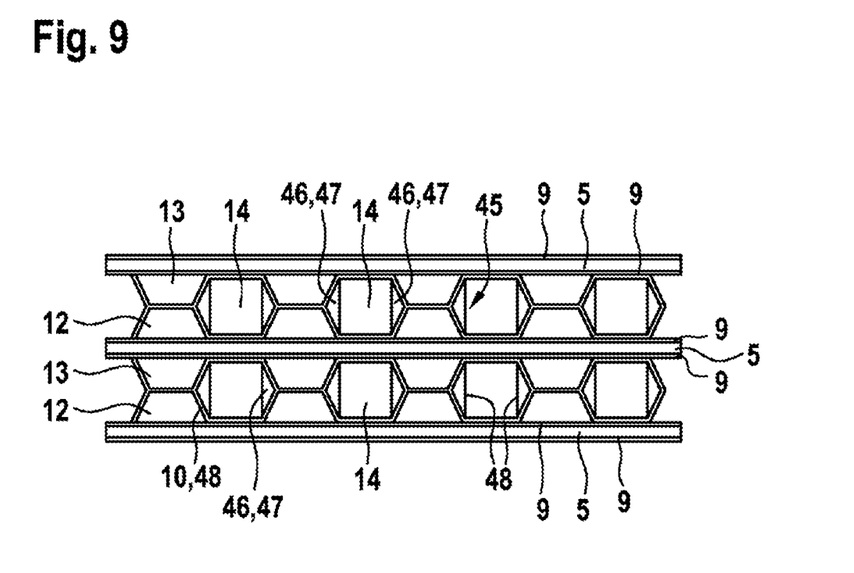
FIG. 9 shows a section through the fuel cell comprising integrated latent heat storage means in a fourth exemplary embodiment and FIG. 10 shows a diagram with time t plotted on the abscissa and temperature T plotted on the ordinate.

FIG. 9 shows a fourth exemplary embodiment of a portion of the fuel cell unit 1. Essentially only the differences from the third exemplary embodiment according to FIG. 8 are described below. The latent heat storage means 45 formed by the walls 48 and the phase-change material 46 are oriented substantially perpendicular to the notional planes (not shown) defined by the gas diffusion layers 9 and the proton-exchange membranes 5.

Considered as a whole the fuel cell unit 1 according to the invention and the fuel cell system 4 according to the invention are associated with substantial advantages. During the idle state of the fuel cell unit 1 at ambient temperatures below 0° C. the phase-change material 46 emits heat of fusion to the stacked fuel cells 2 during cooling, so that freezing of the water in the proton-exchange membranes 5 and the gas spaces 32 occurs only after a very long time of 2 to 6 days, depending how low the outside temperature. During normal operation of a motor vehicle comprising the fuel cell unit 1 startup occurs at the latest every 1 to 2 days, so that the water in the fuel cell unit 1 generally does not freeze even at outside temperatures below 0° C. Water expands during freezing and would therefore cause adverse mechanical stressing of the proton-exchange membranes 5 and the gas diffusion layers 9, i.e. rapid aging of the fuel cell unit 1. This disadvantage can be substantially ruled out because the water in the fuel cell unit 1 according to the invention and the fuel cell system 4 according to the invention does not normally freeze.

What is claimed is:

1. A fuel cell unit (1) in the form of a fuel cell stack (1) for electrochemical generation of electrical energy comprising fuel cells (2) having anodes (7), cathodes (8), proton-exchange membranes (5), gas diffusion layers (9) and bipolar plates (10), wherein the fuel cell unit (1) comprises a housing (41); and at least one latent heat storage device (45) arranged as a layer on an inside surface (42) of the housing (41) such that the at least one latent heat storage device (45) covers at least 80% of the inside surface (42) of the housing (41), the at least one latent heat storage device (45) comprising a phase-change material (46) for preventing or retarding freezing of water in the fuel cells (2), further comprising a wall (48) distinct from the fuel cell stack (1) arranged at a substantially constant distance from the inside surface (42) of the housing (41) and positioned between the fuel cell stack (1) and the housing (41), wherein the at least one latent heat storage device (45) is positioned between the wall (48) and the housing (41).

2. The fuel cell unit as claimed in claim 1, wherein the phase-change material (46) of the at least one latent heat storage device (45) exhibits a phase change in the form of a change in the state of matter from a liquid to a solid to liberate heat as heat of fusion.

3. The fuel cell unit as claimed in claim 2, wherein a solidification point of the phase-change material (46) is between 0° and 60° C.

4. A fuel cell system (4) comprising
a fuel cell unit (1) in the form of a fuel cell stack comprising fuel cells (2),
a compressed gas storage device (21) for storage of gaseous fuel,
a gas conveying apparatus (22) for conveying a gaseous oxidant to the cathodes (8) of the fuel cells (2),
wherein the fuel cell unit is in the form of a fuel cell unit as claimed in claim 1.

5. The fuel cell unit as claimed in claim 3, wherein the solidification point of the phase-change material (46) is between 0° C. and 15° C.

6. The fuel cell unit as claimed in claim 1, wherein the at least one latent heat storage device (45) covers the inside (42) of the housing (41) completely.

7. The fuel cell system (4) of claim 4, wherein the fuel cell system (4) is in a motor vehicle.

8. A fuel cell unit (1) in the form of a fuel cell stack (1) for electrochemical generation of electrical energy comprising fuel cells (2) having anodes (7), cathodes (8), proton-exchange membranes (5), gas diffusion layers (9) and bipolar plates (10), wherein the fuel cell unit (1) comprises at least one latent heat storage device (45) disposed as a layer on an outside surface (49) of the stacked fuel cells (2) such that the at least one latent heat storage device (45) covers at least 80% of the outside surface (49) of the stacked fuel cells (2), the at least one latent heat storage device (45) comprising a phase-change material (46) for preventing or retarding freezing of water in the fuel cells (2), further comprising a wall (48) arranged at a substantially constant distance from an inside surface (42) of a housing (41), wherein the wall (48) separates the at least one latent heat storage device (45) covering at least 80% of the outside surface (49) of the stacked fuel cells (2) from the inside surface (42) of the housing (41), further comprising feet (44) configured to fix the stacked fuel cells (2) to the housing (41), the feet (44) extending through the wall (48).

9. The fuel cell unit as claimed in claim 8, wherein the at least one latent heat storage device (45) covers the outside (49) of the stacked fuel cells (2) completely.

10. A fuel cell unit (1) in the form of a fuel cell stack (1) for electrochemical generation of electrical energy comprising fuel cells (2) having anodes (7), cathodes (8), proton-exchange membranes (5), gas diffusion layers (9) and bipolar plates (10), wherein the fuel cell unit (1) comprises at least one latent heat storage device (45) arranged in fluid-tight cavities (47) integrated in and/or on the bipolar plates (10) of the fuel cells (2), wherein each bipolar plate (10) includes a channel (14) configured for a coolant positioned between the fluid-tight cavities (47).

11. The fuel cell unit as claimed in claim 10, wherein a plurality of latent heat storage devices (45) further includes separate partial masses of a phase-change material (46) integrated into the fluid tight-cavities (47).

12. The fuel cell unit as claimed in claim 1, further comprising a layer of thermal insulation (51) positioned between the at least one latent heat storage device (45) and the housing (41).

13. The fuel cell unit as claimed in claim 1, further comprising feet (44) engaging the wall (48) to fix the stacked fuel cells (2) to the wall (48).

* * * * *